United States Patent [19]
Lessard
[11] Patent Number: 4,878,607
[45] Date of Patent: Nov. 7, 1989

[54] APPARATUS FOR UNREELING A CABLE

[75] Inventor: Michel Lessard, Lac St Jean, Canada
[73] Assignee: Less Micanik Inc., Quebec, Canada

[21] Appl. No.: 264,972
[22] Filed: Oct. 31, 1988
[51] Int. Cl.[4] ........................ B66D 1/48; B60P 3/00
[52] U.S. Cl. ........................ 226/24; 242/86.51; 254/268
[58] Field of Search ........................ 226/10, 24, 42, 43; 242/86.5 R, 86.51, 54 R, 86.8; 254/268, 274, 275; 200/61.18

[56] References Cited

U.S. PATENT DOCUMENTS

| | | | |
|---|---|---|---|
| 1,100,140 | 6/1914 | Mayers | 242/86.51 |
| 3,380,545 | 4/1968 | Kemper | 242/86.51 |
| 3,601,038 | 8/1971 | Hayes | 226/187 X |
| 3,693,939 | 9/1972 | Buckson | 254/268 |
| 4,087,165 | 5/1978 | Pasturczak et al. | 226/76 X |
| 4,114,827 | 9/1978 | Maier | 242/86.51 |
| 4,454,999 | 6/1984 | Woodruff | 242/86.5 R |
| 4,588,142 | 5/1986 | Malzacher | 242/86.8 |
| 4,629,390 | 12/1986 | Burke | 242/86.5 R X |
| 4,666,102 | 5/1987 | Colbaugh et al. | 242/86.51 X |
| 4,700,023 | 10/1987 | Hillmann et al. | 242/86.51 X |

*Primary Examiner*—John M. Jillions
*Assistant Examiner*—Phillip S. Han
*Attorney, Agent, or Firm*—Foley & Lardner, Schwartz, Jeffery, Schwaab, Mack, Blumenthal & Evans

[57] ABSTRACT

The present disclosure describes an apparatus for unreeling a cable. The apparatus comprises a drawing mechanism for unreeling the cable. This drawing mechanism includes a motor provided with a shaft, a disk having its center rigidly locked to the shaft, the disk being provided with three pins perpendicular to its surface, and a wheel having its center positioned around the shaft by means of a ball bearing. The wheel has one of its lateral sides adjacent to the disk surface provided with the pins, the side of the wheel being provided with three slots extending circumferentially for receiving the three pins in such a manner that phase displacement is allowed between the disk and the wheel. Three springs are provided for keeping each pin against the forward extremity of its respective slot. The circumference of the wheel is covered by a resilient friction-surface adapted to squeeze the cable against a rotative guiding roller which allows unreeling of the cable by rotative movement of the wheel. The apparatus also comprises a hydraulic cylinder for applying the wheel against the rotative guiding roller, and a detecting and controlling mechanism for detecting a phase displacement between the wheel and the disk, and, upon detection of such phase displacement, activating the motor, when the cable is in a rest position, or disabling the motor when the cable is unreeling.

8 Claims, 3 Drawing Sheets

APPARATUS FOR UNREELING A CABLE

FIELD OF THE INVENTION

The present invention relates to an apparatus for unreeling a cable. More particularly, the present invention relates to steel cables used in forest industries for dragging trees from the site to where the trees have been cut.

BACKGROUND OF THE INVENTION

The steel cables of the type described above are quite heavy; the workers that handle these cables have to spend a great amount of energy to bring them over the site where the trees are cut. Sometimes, there is a relatively long distance between the forest vehicle onto which the winch operating the cable is mounted, and the divers sites where trees are cut. In many cases, the forest worker has to bring the cable himself with his own hands over the appropriate site.

It is an object of the present invention to provide an apparatus for unreeling heavy cables.

It is another object of the present invention to provide an apparatus for unreeling heavy cables in a safe and efficient manner.

It is also an object of the present invention to provide an apparatus for unreeling heavy cables without requiring a great amount of energy from the person handling the apparatus.

SUMMARY OF THE INVENTION

According to the present invention, there is provided an apparatus for unreeling a cable, comprising:

a body provided with positioning means for moving said body with respect to a solid frame; a drawing means for unreeling said cable, including:

- a motor provided with a shaft;
- a disk having its centre rigidly locked to said shaft, said disk having a lateral surface provided with at least one pin perpendicular to said surface; and
- a wheel having its centre positioned around said shaft by means of a ball bearing, said wheel having one of its lateral sides adjacent to said lateral surface of said disk, said one lateral side of the wheel being provided with at least one slot extending circumferentially for receiving said at least one pin in such a manner that phase displacement is allowed between said disk and said wheel, resilient means being provided for keeping said at least one pin against the forward extremity of said at least one slot, said wheel having its circumference covered by a resilient friction-surface adapted to squeeze said cable against a rotative guiding roller which allows unreeling of said cable by rotative movement of said wheel, said wheel being applied against said rotative guiding roller to squeeze said cable by means of said positioning means; and detecting and controlling means for detecting said phase displacement and, upon detection of said phase displacement, activating said motor, when said cable is in a rest position, or disabling said motor when said cable is unreeling.

The objects, advantages and other features of the present invention will become more apparent upon reading of the following non-restrictive description of a preferred embodiment thereof, given for the purpose of examplification only with reference to accompanying drawings.

DETAILED DESCRIPTION OF A PREFERRED EMBODIMENT

Figure 1:
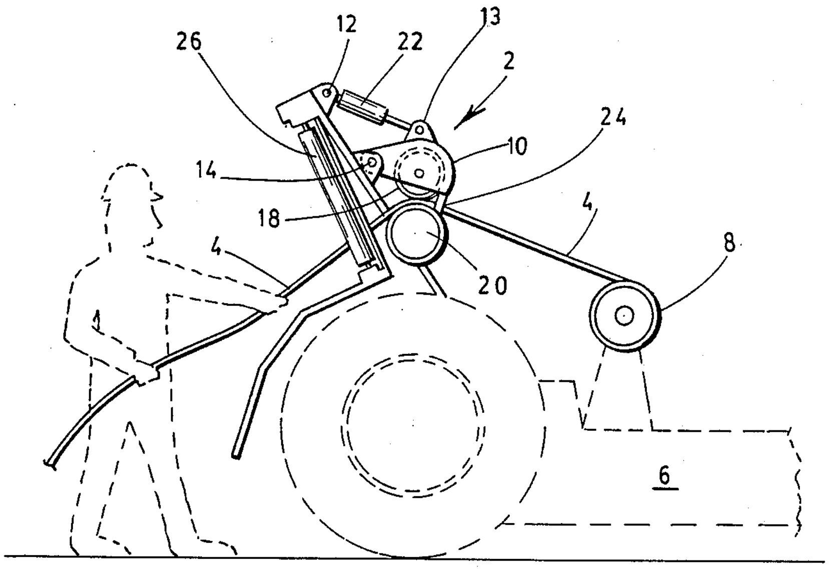
FIG. 1 is a side view of one embodiment of the apparatus for unreeling a cable, and a schematic partial side view of the forest vehicle onto which the apparatus is mounted according to the present invention.
Figure 2:
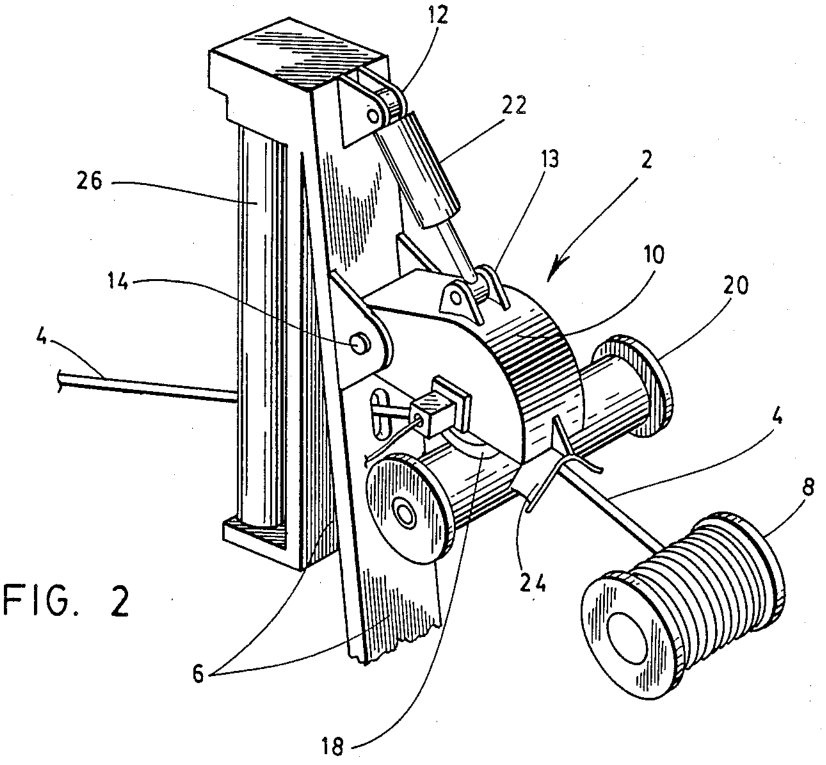
FIG. 2 is a perspective view of the apparatus shown in FIG. 1 with a partial view of the forest vehicle.

In FIGS. 1 and 2, there are shown an apparatus 2 for unreeling a cable 4. In FIG. 1, there is shown in a partial side view the forest vehicle 6 onto which the apparatus 2 is mounted. A winch 8 is used for reeling the cable 4. The apparatus 2 comprises a body 10 made of steel provided with a hydraulic cylinder 22 for moving the body 10 with respect to the frame of the vehicle 6. The cylinder 22 has one extremety attached to the frame of the forest vehicle 6 by means of a pivot 12, and its other extremety attached to the body 10 by another pivot 13. The body 10 is also connected to the frame of the vehicle 6 by another pivot 14 so that the wheel 18 of the apparatus 2 can be applied against and removed away from a rotative guiding roller 20 fixed to the frame of the vehicle 6, by a movement of the cylinder 22.

The apparatus 2 also comprises a drawing mechanism for unreeling the cable 4. The mechanism comprises a motor that drives the wheel 18 having its circumference covered by a resilient friction-surface adapted to squeeze the cable 4 against the rotative guiding roller 20. The guiding roller 20 allows unreeling of the cable 4 by rotative movement of the wheel 18. The friction-surface is made of hard caoutchouc. The hydraulic cylinder 22 is provided for applying the wheel 18 against the rotative guiding roller 20 to squeeze the cable 4.

As it can be seen on FIGS. 1 and 2, the forest vehicle 6 is provided with lateral guiding rollers 26 for guiding the cable 4 during unreeling. The apparatus 2 is also provided with a guiding device 24 having a V shaped for guiding the cable 4 coming from the winch 8.

Figure 3:
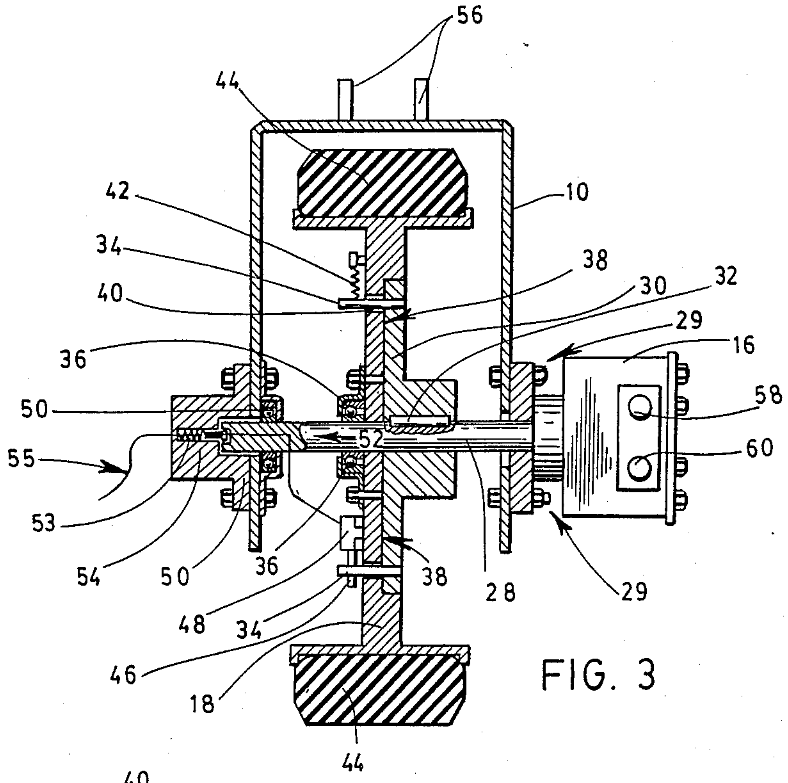
FIG. 3 is a partial cross-section view illustrating the apparatus shown in FIGS. 1 and 2.
Figure 4:
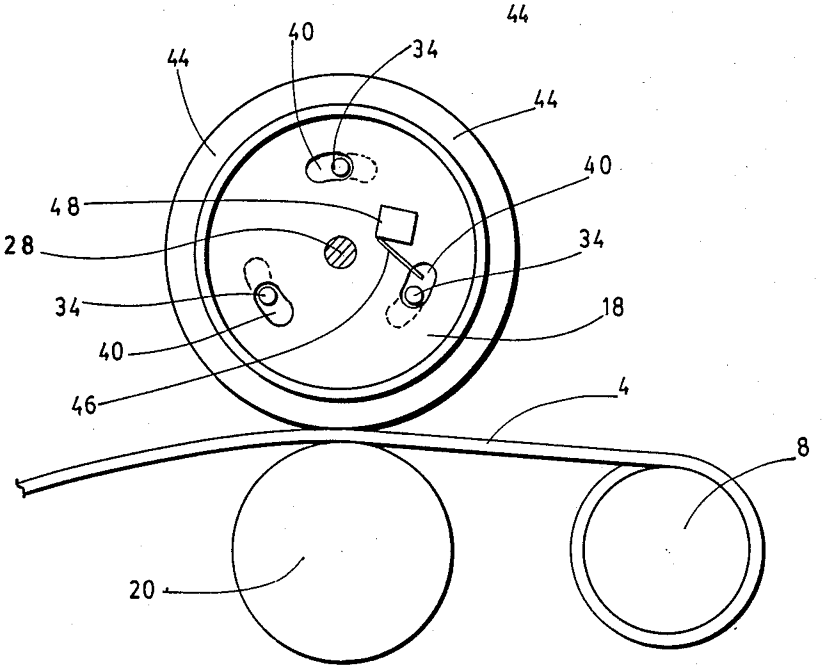
FIG. 4 is a schematic diagram illustrating the wheel, the cable to be unreeled and the rotative guiding roller while the wheel is applied against the rotative guiding roller.

Referring now to FIGS. 3 and 4, the motor 16 is fixed to the body 10 of the apparatus 2 by means of bolts and screws 29. The motor 16 drives a shaft 28 around which the centre of a disk 30 is rigidly locked by means of a locking key 32. The disk 30 is provided with three pins 34 perpendicular to its surface.

The wheel 18 of the apparatus 2 has its centre positioned around the shaft 28 by means of a ball bearing 36. The wheel 18 has one 38 of its lateral sides adjacent to the disk surface provided with the pins. The side 38 of the wheel 18 is provided with three slots 40 extending circumferentially for receiving the three pins 34 in such a manner that phase displacement is allowed between the disk 30 and the wheel 18. Three springs 42 are provided for keeping each pin 34 against the forward extremity of its respective slot 40.

The wheel 18 has its circumference covered by a resilient friction-surface 44 adapted to squeeze the cable 4 against the rotative guiding roller 20 which allows unreeling of the cable 4 by rotative movement of the wheel 18.

The apparatus 2 is also provided with a detecting and controlling mechanism for detecting phase displacement between the disk 30 and the wheel 18 and, upon detection of such phase displacement, activating the motor 16, when the cable 4 is in a rest position, or disabling the motor 16 when the cable 4 is unreeling. The detecting and controlling mechanism comprises a movement detector 46 for detecting movement of one of the pins 34 along its respective slot 40, the movement of the pin being indicative of phase displacement between the wheel 18 and the disk 30. This mechanism also comprises a two-position toggle switch 48 for controlling the motor 16. The toggle switch 48 is activated from one position to the other upon detection of a movement by the movement detector 46. The slots 40 have a preselected length to allow a phase displacement of at least 10° between the disk 30 and the wheel 18.

The shaft 28 is also supported by a ball bearing 50 fixed to the body 10. An aperture is provided in the body 10 for receiving the extremity 52 of the shaft 28. The extremity 52 of the shaft 28 emerging outside of the body 10 is covered by a plastic lid 54. The shaft 28 and the plastic lid 54 are provided with a channel to allow a way out of the apparatus for the toggle switch wire 55 connected to the system controlling the motor 16. The portion of the channel inside the plastic lid 54 is provided with a rotative contact brush 53 surrounding the wire 55. This contact brush 53 allows rotation of the wire inside the plastic lid 54.

The body 10 is provided with salient parts 56 onto which is attached one extremity of the hydraulic cylinder by means of a pivot. The motor 16 is a hydraulic motor provided with an inlet 58 and an outlet 60 for the pressurized liquid.

Figure 5:
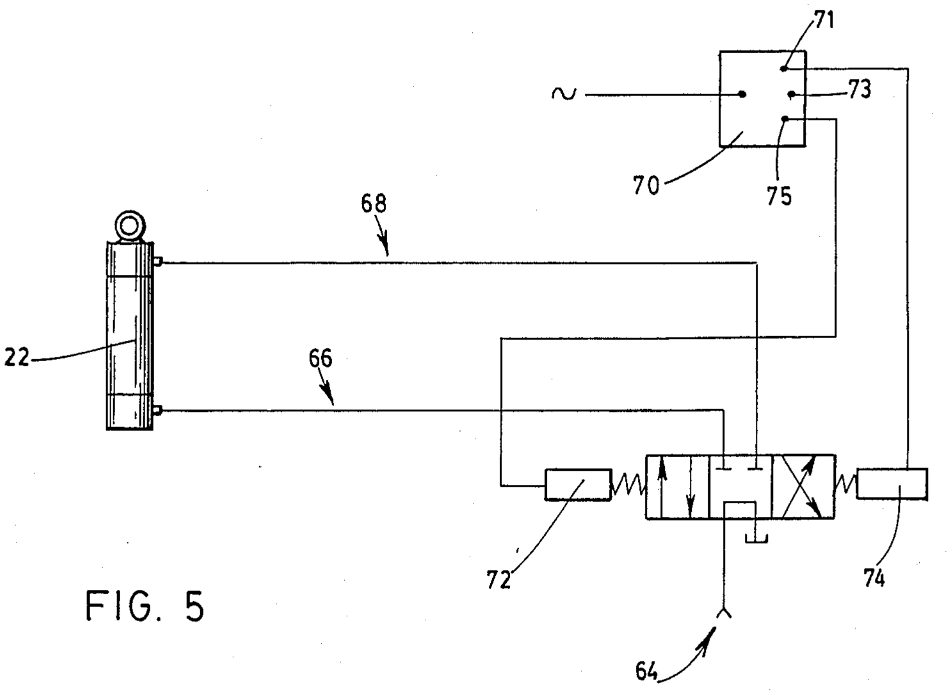
FIG. 5 is a schematic diagram illustrating the hydraulic and electric circuitries connected to the hydraulic cylinder shown in FIGS. 1 and 2.

Referring now to FIG. 5, there is shown a schematic diagram illustrating the hydraulic and electric circuitries connected to the hydraulic cylinder 22. A pressurized liquid is injected at 64. The pipes 66 and 68 conduct the pressurized liquid to the hydraulic cylinder 22. The hydraulic circuitry is controlled by an electric circuitry comprising a three-positions switch 70. When the switch 70 is set on the first position 71, the cylinder 22 is extended to apply the wheel 18 against the rotative guiding roller 20, on the second position 73, the hydraulic cylinder 22 is immobilized, and on the third position 75, the cylinder 22 is retracted to remove the wheel 18 away from the guiding roller 20. The three-position switch 70 is connected to two solenoids 72 and 74 which control the hydraulic circuitry. A first solenoid 72 is activated for retracting the hydraulic cylinder 22, and the second solenoid 74 is activated for extending the hydraulic cylinder 22. The three-position switch 70 is handled by the worker operating the apparatus.

Figure 6:
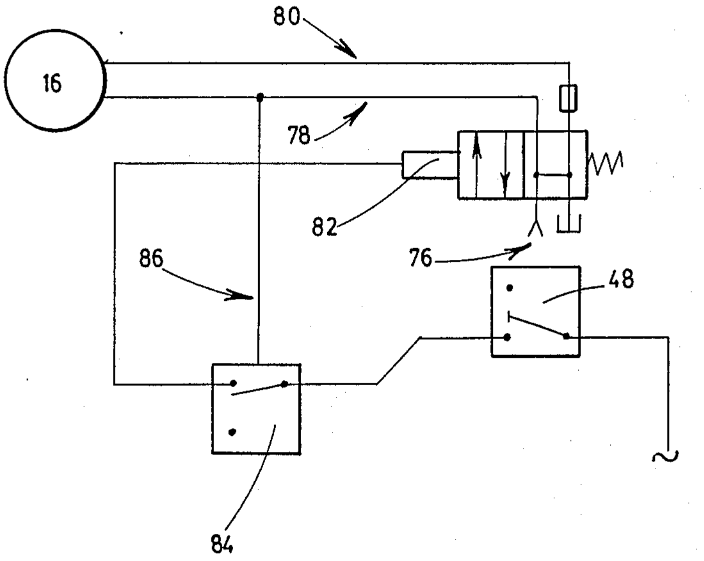
FIG. 6 is a schematic diagram illustrating the hydraulic and electric circuitries connected to the hydraulic motor of the apparatus shown in FIGS. 1, 2 and 3.

Referring now to FIG. 6, there is shown a schematic diagram illustrating the hydraulic and electric circuitries connected to the hydraulic motor 16. A pressurized liquid is injected at 76. The pipes 78 and 80 conduct the pressurized liquid to the hydraulic motor 16. The hydraulic circuitry is controlled by the two-position toggle switch 48 fixed to the wheel 18. When the toggle switch 48 is in a first position, the motor is disabled, and when it is in the second position, the motor is activated to rotate the wheel 18 and consequently draw the cable 4. The two-position toggle switch 48 controls the hydraulic circuitry by means of a solenoid 82. An electrical switch 84 is provided along the line connecting the two-position toggle switch 48 to the solenoid 82. The opening of this switch 84 is controlled by the hydraulic circuitry via the hydraulic line 86. The switch 84 is opened when the pressurized liquid in the hydraulic circuitry reaches a certain pressure.

To operate the apparatus 2, the worker set the operating mode of the winch 8 so that the cable 4 can be freely drawn from it. Then the worker manipulates the three-position switch 70 to extend the cylinder 22, and consequently apply the wheel 18 against the rotative guiding roller 20. Thus, the cable 4 is squeezed between the wheel 18 and the rotative guiding roller 20. At this stage, the worker can control the motor 16 only by jerking the cable 4 to produce a phase displacement between the wheel 18 and the disk 30.

To start the unreeling operation of the cable 4, the worker jerks the cable 4. This jerking action produces a phase displacement between the wheel 18 and the disk 30, such phase displacement puts the toggle switch 48 in its second position, and consequently activates the motor 16. Thus, the wheel starts to rotate, and the cable 4 is drawn by the friction force applied on it by the wheel 18.

When the worker wants to stop the unreeling operation, he just has to jerk the cable 4 again to switch the toggle switch 48 from its second position back to its first position, consequently the motor 16 is stopped. The worker can start again the unreeling operation by jerking the cable 4 again. Thus, the unreeling operation can be controlled by the worker even if he is far away from the apparatus 2.

When the cylinder 22 is extended and the wheel 18 is applied against the rotative guiding roller 20; whenever the worker pulls the cable 4 to jerk it, the wheel 18 moves with respect to the disk 30 so that a phase displacement is produced between the wheel 18 and the disk 30 and the movement detector senses the movement of the adjacent pin along its respective slot regardless of the operating conditions of the motor 16. Then, the motor 16 is stopped or activated depending of the operating condition thereof.

When the worker reaches the site where the trees are cut, he jerks the cable 4 to stop the motor 16. Then, the cable 4 is attached to the trees to be brought back to the forest vehicle 6. To bring back the trees to the forest vehicle 6, the three-position switch 70 is activated to remove the wheel 18 away from rotative guiding roller 20; and then, the winch 8 can be activated to start the reeling operation of the cable 4.

Although, the present invention has been explained hereinabove by way of a preferred embodiment thereof, it should be pointed out that any modifications to this preferred embodiment, within the scope of the appended claims is not deemed to change or alter the nature and scope of the present invention.

The embodiments of the invention in which an exclusive property or privilege is claimed are defined as follows:

1. Apparatus for unreeling a cable, comprising:

a body provided with positioning means for moving said body with respect to a solid frame;

a drawing means for unreeling said cable, including:

a motor provided with a shaft;

a disk having its centre rigidly locked to said shaft, said disk having a lateral surface provided with at least one pin perpendicular to said surface; and a wheel having its centre positioned around said shaft by means of a ball bearing, said wheel having one of its lateral sides adjacent to said lateral surface of said disk , said one lateral side of the wheel being provided with at least one slot extending circumferentially for receiving said at least one pin in such a manner that phase displacement is allowed between said disk and said wheel, resilient means being provided for keeping said at least one pin against the forward extremity of said at least one slot, said wheel having its circumference covered by a resilient frictionsurface adapted to squeeze said cable against a rotative guiding roller which allows unreeling of said cable by rotative movement of said wheel, said wheel being applied against said rotative guiding roller to squeeze said cable by means of said positioning means; and detecting and controlling means for detecting said phase displacement and, upon detection of said phase displacement, activating said motor when said cable is in a rest position or disabling said motor when said cable is unreeling.

2. Apparatus according to claim 1, wherein:

said positioning means comprise a hydraulic cylinder having one extremity attached to said solid frame by pivot means, and its other extremity attached to said body by pivot means; and said body is also connected to said solid frame by pivot means so that said wheel can be applied against or removed away from said rotative guiding roller by an action of said hydraulic cylinder.

3. Apparatus according to claim 1, wherein said detecting and controlling means comprise a movement detector for detecting movement of said at least one pin along its respective slot, and a two-position toggle switch for controlling said motor, said toggle switch being activated from one position to the other upon detection of a movement by said movement detector.

4. Apparatus according to claim 1, 2 or 3, wherein said resilient means comprise at least one spring.

5. Apparatus according to claim 1, 2 or 3, wherein said resilient friction-surface is made of hard caoutchouc.

6. Apparatus according to claim 1, 2 or 3, wherein said disk surface is provided with three pins, and said one lateral side of said wheel is provided with three slots.

7. Apparatus according to claim 1, 2 or 3, wherein said drawing means includes a guiding device having a V shaped for guiding said cable during unreeling.

8. Apparatus according to claim 1, 2 or 3, wherein said at least one slot has a preselected length to allow a phase displacement of at least 10° between said disk and said wheel.

* * * * *